March 1, 1955 A. C. WINTEMBERG 2,703,057
RAILWAY TRUCK AND ASSOCIATED STRUCTURE
Filed April 7, 1950 2 Sheets-Sheet 1

Inventor
Adelbert C. Wintemberg
By Rodney Bedell
Atty.

March 1, 1955  A. C. WINTEMBERG  2,703,057
RAILWAY TRUCK AND ASSOCIATED STRUCTURE
Filed April 7, 1950  2 Sheets-Sheet 2

Inventor
Adelbert C. Wintemberg
By Rodney Bedell
Atty.

United States Patent Office 2,703,057
Patented Mar. 1, 1955

2,703,057

RAILWAY TRUCK AND ASSOCIATED STRUCTURE

Adelbert C. Wintemberg, Drexel Hill, Pa., assignor to General Steel Castings Corporation, Granite City, Ill., a corporation of Delaware Application April 7, 1950, Serial No. 154,572

11 Claims. (Cl. 105—188)

The invention relates to railway rolling stock and more particularly to the support of a railway vehicle body on the wheel and axle assemblies of a truck having a swivel connection to the body, the invention being well adapted for a motor driven truck with three wheel and axle assemblies with an individual motor associated with each assembly.

One object of the invention is to support each motor in part from the truck frame independently of the other motors and in a manner to facilitate the mounting of other truck parts, such as a lateral motion bolster and to provide for a minimum height of the body supporting elements of the truck and further to provide for a minimum height of the truck wheel piece.

Another object of the invention is to form a three point suspension on the truck for a vehicle body, thereby providing a stable support of the body and making possible the distribution of the truck load to the truck frame at a plurality of points spaced apart so as to be conducive to reducing the weight of the truck frame and bolster.

These and other detail objects, which will appear from the following detail description of a selected form of the invention, are attained by the structure illustrated in the accompanying drawings, in which.

Figure 1:
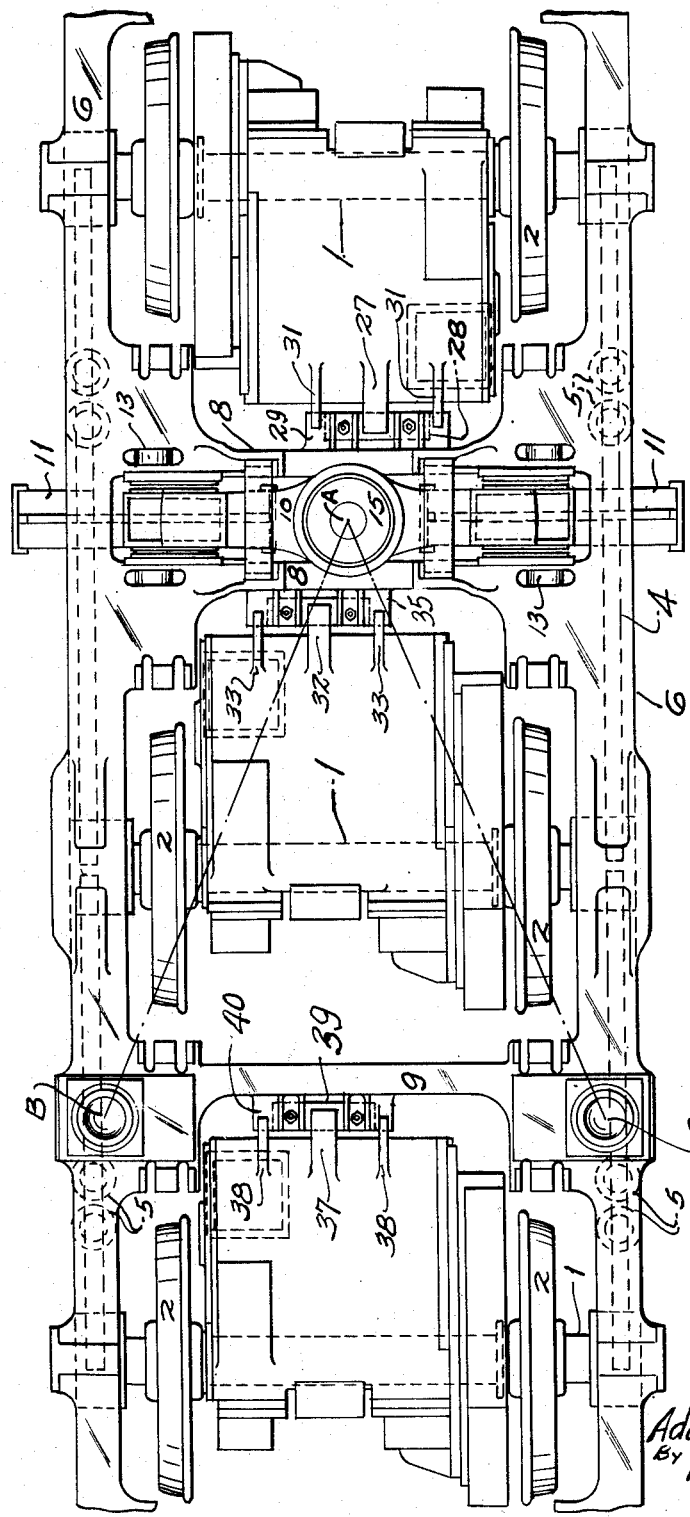
Figure 1 is a top view of a railway six wheel motor truck with each pair of wheels being driven by an individual motor, the extreme ends of the truck frame being broken away to show the parts drawn to a larger scale.
Figure 2:
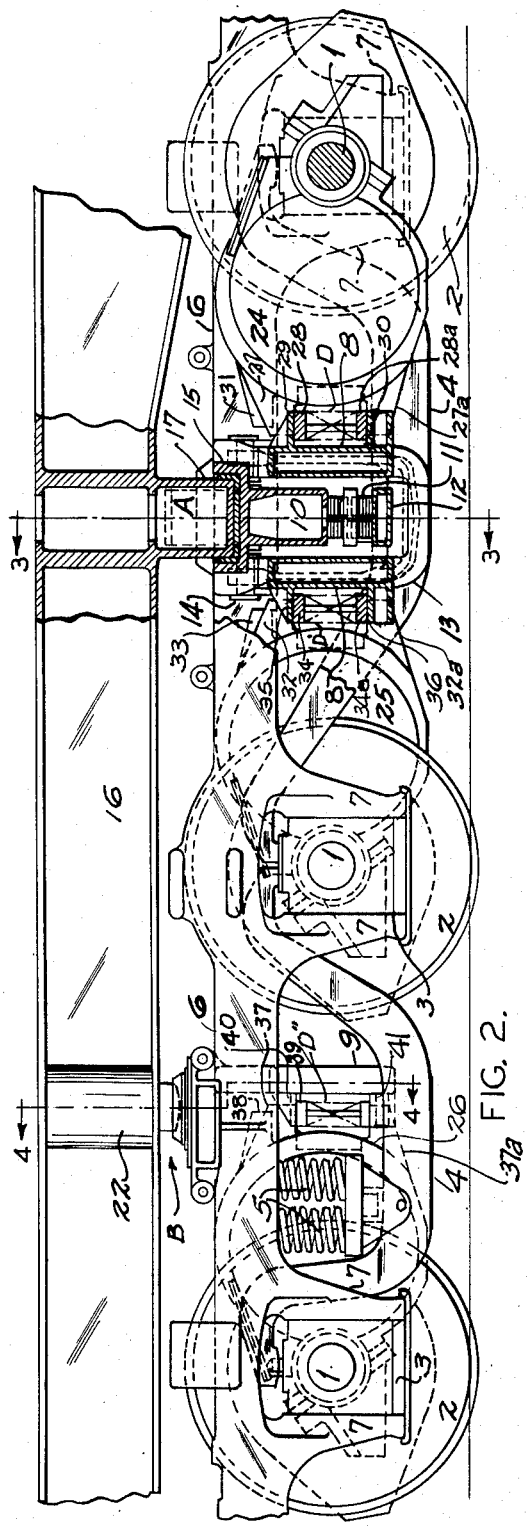
Figure 2 is in part a side view and in part a vertical section on the center line of the truck shown in Figure 1.
Figure 3:
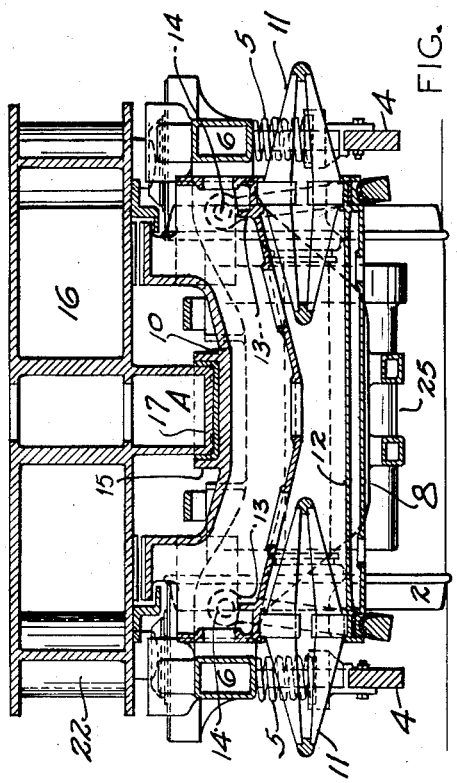
Figure 3 is a transverse vertical section on the line 3—3 of Figure 2.
Figure 4:
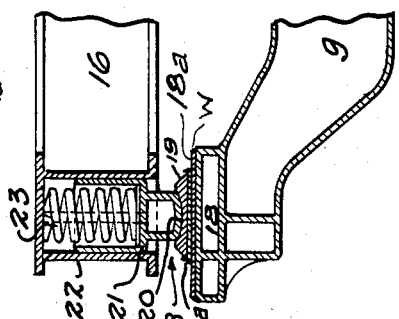
Figure 4 is a vertical transverse section taken on the line 4—4 of Figure 2.

The truck includes three units, each comprising an axle 1, and a pair of wheels 2. Journal boxes 3, mounted on the ends of axles 1, support the ends of drop equalizers 4 which mount springs 5 which carry the truck frame, including side members or wheel pieces 6 with pairs of depending pedestal jaws 7, each pair slidably receiving between them a corresponding journal box 3. The truck frame is provided with a pair of transverse transoms 8, intermediate the middle wheel and axle assembly and one of the end wheel and axle assemblies, and the truck frame is provided with a single transverse transom 9, intermediate the middle wheel and axle assembly and the other end wheel and axle assembly. Transoms 8 are spaced apart to receive between them a bolster 10 which provides one support at A for the vehicle body. Bolster 10 is supported by springs 11 from a spring plank 12 by swing hangers 13 suspended from pivot pins 14 seated on the truck frame adjacent the merging of transoms 8 with wheel pieces 6. Bolster 10 has a center plate structure 15 for pivotally supporting the vehicle body underframe 16 through a cooperating body center plate 17. The details of the bolster mounting correspond generally to truck bolster constructions in general use and provide for movement of the bolster laterally of the truck frame and vertically of the truck frame as is well known in the art.

The truck frame supports the vehicle body at two points B adjacent the ends of transom 9 through parts movable relative to each other vertically and laterally and arcuately of the truck. Each support structure includes a renewable wear plate 18a welded at W to the elevated end platform 18 of transom 9, and a foot 19 provided with a renewable wear plate 19a slidable on pate 18a, the foot having a spherical section seat 20 for the lower end of a plunger 21 slidably received in a housing 22 in the body underframe 16. A nest of coil springs 23, carried by the plunger, yieldingly supports the vehicle body.

The above described structure provides three points of support at A, B, B for the vehicle body, support A being movable transversely of the truck frame by the swinging of hangers 13 and being movable vertically of the truck frame by the action of the swing hangers and of springs 11. Supports B are movable transversely and longitudinally of the truck by the sliding of feet 19 over plates 18a and the body, including the support housings 22, is movable vertically relative to the truck frame by the action of springs 23. The provision for the relative horizontal and vertical movements mentioned accommodates the swiveling of the truck and vehicle body, as is necessary when the vehicle is on curved track, and also accommodates movement of the vehicle body transversely of the truck to ease lateral thrusts, due to uneven rail joints and other causes, and also accommodates vertical tilting of the vehicle body relative to its supporting structure, due to the vertical action of springs 5, 11, and 23 to ease vertical shocks.

Associated with the wheel and axle assemblies are individual motors 24, 25 and 26, respectively, each motor with its gearing and housing being supported in part on the associated axle and in part upon the adjacent transom. The left hand end of the housing of motor 24 has a center lug 27 supported on the top cross bar 28 of a spring mounting device D positioned between transom brackets 29, 30. A corresponding center lug 27a on the lower portion of the motor housing opposes the lower cross bar 28a of the spring device to resist torque tending to rotate the housing of motor 24 in a clockwise direction. The motor housing has safety lugs 31 at the sides of center lug 27 which function to support the housing on bracket 29 in the event of failure of center lug 27.

The right hand end of the housing of motor 25 has similar center lugs 32, 32a associated with the cross bars 34, 34a of spring mounting device D' positioned between transom brackets 35, 36. Safety lugs 33 extend over bracket 35. Brackets 29, 30, 35, 36, being at the outer sides of transoms 8, may be at any desired level relative to bolster 10 and springs 11 without affecting the construction or positioning of the bolster or its support of the vehicle body at A.

The right hand end of motor 26 has center lugs 37, 37a associated with a spring mounting device D" positioned between brackets 40, 41 of transom 9. Safety lugs 38 extend over bracket 40. Brackets 40, 41 will not affect the construction or positioning of the structures which support the vehicle body at B.

The three point support of the vehicle body provides stability against undue lateral tilting and distributes the body load to the truck frame at points adjacent to the truck supporting springs 5. Truck springs 5, bolster springs 11, coil springs 23, equalizers 4 and the relative spacing of points A, B, B may be varied to distribute the weight as desired, a preferable arrangement being to have one-half of the truck load applied to support A and the other half of the truck load divided between supports B.

The construction makes possible a lower center plate than if the center plate were positioned over one of the motors and the use of a single lateral motion bolster between spaced transoms and the sliding supports on the frame makes possible a shorter wheel base than if the usual H-shaped bolster with both transverse members positioned between spaced frame transoms were used.

These advantages and other features of the construction may be retained with substantial changes in the details of the structure and the exclusive use of those modifications of the invention coming within the scope of the claims is contemplated.

What is claimed is:

1. In a railway vehicle, wheels and axles, a truck frame supported thereon and having a pair of transverse transoms between the middle of the truck and one end of the truck, a bolster between said transoms and supported therefrom for movement transversely of the frame, a vehicle body, a body supporting center plate intermediate the ends of said bolster, said frame having a transverse transom between the middle of the truck and the other end of the truck, and a body support on the truck frame adjacent each end of the latter-mentioned transom, and movable with the truck frame transversely of the body.

2. In a railway vehicle truck, three wheel and axle assemblies, a truck frame supported thereon and having a transverse transom substantially intermediate the middle wheel and axle assembly and one of the end wheel and axle assemblies, and having a pair of transverse transoms spaced apart longitudinally of the truck and positioned between said middle wheel and axle assembly and the other end wheel and axle assembly, a bolster mounted on the frame for lateral movement between said latter-mentioned transoms, a center plate at the middle of said bolster and supporting superstructure on the truck and for pivotally mounting the truck to the superstructure, and points of support at the sides of the truck frame adjacent said first-mentioned transom and supporting vehicle superstructure on the truck.

3. In a railway vehicle truck, three wheel and axle assemblies, a truck frame supported thereon and having a transverse transom between the middle wheel and axle assembly and one of the end wheel and axle assemblies and having a pair of transverse transoms spaced apart longitudinally of the truck and positioned between said middle wheel and axle assembly and the other end wheel and axle assembly, a bolster mounted to move laterally of said frame between said latter-mentioned transoms, a motor mounted in part on each wheel and axle assembly and in part on a respective transom, the supports for the motors on the transoms at opposite sides of the bolster being at the sides of the transoms facing away from the bolster and the portions of the motors supported on the transoms being above the level of the bottom of the bolster, a vehicle body support on said bolster, and a vehicle body support on the first-mentioned transom.

4. In a railway vehicle, three wheel and axle assemblies, a truck frame supported thereon and having a transverse transom between the middle wheel and axle assembly and one of the end wheel and axle assemblies and having a pair of transverse transoms spaced apart longitudinally of the truck and positioned between said middle wheel and axle assembly and the other end wheel and axle assembly, hangers suspended from said frame near the opposite ends of said pair of transoms to swing transversely of the truck, springs carried by the lower ends of said swing hangers, a load supporting bolster supported on said springs, a motor on each of the adjacent wheel and axle assemblies extending toward said pair of transoms and including a portion supported by the opposing sides of the latter above the level of the supports for said springs, a motor on the other wheel and axle assembly and supported in part by the adjacent transom, a vehicle body support at the center of said bolster, and vehicle body supports on the truck frame near the ends of the first-mentioned transom.

5. In a railway vehicle truck, wheels and axles, a truck frame supported thereon, a bolster mounted on said truck frame for movement relative thereto laterally of the truck, the truck including at least three supports for mounting a vehicle superstructure, each of said supports being disaligned longitudinally and transversely of the truck with at least one other of said supports, at least one of said supports being on said truck frame and another of said supports being on said bolster.

6. In a railroad vehicle truck, wheels and axles, a truck frame supported thereon, a bolster mounted on said truck frame for movement laterally thereof, the truck including three supports for mounting vehicle superstructure comprising two supports on the truck frame at opposite sides of the truck and a single support on said bolster intermediate the sides of the truck.

7. In a railway vehicle truck, wheels and axles, a truck frame supported thereon and having a pair of transverse transoms spaced apart longitudinally of the truck, a bolster suspended between said transoms for movement relative thereto transversely of the truck and providing a single pivotal vehicle body support element intermediate its ends, said frame having elements spaced longitudinally of the truck from said pair of transoms for slidably supporting a vehicle body at opposite sides of the truck.

8. A railroad truck as described in claim 7 in which the vehicle body-support elements on the frame provide for movement of the vehicle body transversely and horizontally arcuately of the truck relative to the body support element on the bolster.

9. A railway vehicle as described in claim 1 in which the body supports at the ends of the truck frame transom are also movable horizontally arcuately of the body about the center plate.

10. A railway vehicle as described in claim 1 in which the truck bolster is spring-supported from the truck frame, and the vehicle body is provided with yielding mountings on the truck frame body supports at the ends of the truck frame transom.

11. A railway vehicle as described in claim 1 in which the truck bolster is spring-supported from the truck frame and the vehicle body is provided with yielding mountings carried on the truck frame body supports at the ends of the truck frame transom and said supports are movable horizontally arcuately of the body about the center plate.

References Cited in the file of this patent

UNITED STATES PATENTS

| Number | Name | Date |
|---|---|---|
| 927,386 | Vauclain | July 6, 1909 |
| 975,303 | Vauclain | Nov. 8, 1910 |
| 1,271,682 | Eaton | July 9, 1918 |
| 1,331,887 | Van Dyke | Feb. 24, 1920 |
| 1,827,975 | Driemeyer | Oct. 20, 1931 |
| 1,895,500 | Todd | Jan. 31, 1933 |
| 2,042,177 | Howard | May 26, 1936 |
| 2,243,640 | Maris | May 27, 1941 |
| 2,252,382 | Lanning | Aug. 12, 1941 |